United States Patent
Niemar et al.

(10) Patent No.: US 10,156,649 B2
(45) Date of Patent: Dec. 18, 2018

(54) DUAL CORE LOCKING GEOPHONE

(71) Applicant: Halliburton Energy Services, Inc., Houston, TX (US)

(72) Inventors: R. Niemar, Shandong (CN); Wei Hsuan Huang, Singapore (SG); Yee Siang Teh, Singapore (SG); YongAn Yan, Shangdong (CN)

(73) Assignee: Halliburton Energy Services, Inc., Houston, TX (US)

( * ) Notice: Subject to any disclaimer, the term of this patent is extended or adjusted under 35 U.S.C. 154(b) by 395 days.

(21) Appl. No.: 14/906,864

(22) PCT Filed: Dec. 29, 2014

(86) PCT No.: PCT/US2014/072578
§ 371 (c)(1),
(2) Date: Jan. 21, 2016

(87) PCT Pub. No.: WO2016/108826
PCT Pub. Date: Jul. 7, 2016

(65) Prior Publication Data
US 2016/0327666 A1    Nov. 10, 2016

(51) Int. Cl.
*G01V 1/00*     (2006.01)
*G01V 1/16*     (2006.01)
*G01V 1/18*     (2006.01)

(52) U.S. Cl.
CPC .............. *G01V 1/162* (2013.01); *G01V 1/181* (2013.01); *G01V 1/182* (2013.01); *G01V 1/183* (2013.01); *G01V 1/184* (2013.01); *G01V 2210/1429* (2013.01)

(58) Field of Classification Search
CPC ........ G01V 1/183; G01V 1/184; G01V 1/162; G01V 1/182
See application file for complete search history.

(56) References Cited

U.S. PATENT DOCUMENTS

| | | |
|---|---|---|
| 4,504,932 A | 3/1985 | Sundt |
| 4,751,688 A | 6/1988 | Paulsson |
| 5,050,130 A | 9/1991 | Rector et al. |
| 5,062,084 A | 10/1991 | Schoepf et al. |
| 5,119,345 A | 6/1992 | Woo et al. |

(Continued)

FOREIGN PATENT DOCUMENTS

| | | |
|---|---|---|
| RU | 2240583 C1 | 11/2004 |
| SU | 855580 A1 | 8/1981 |
| SU | 1594472 A1 | 9/1990 |

OTHER PUBLICATIONS

International Search Report and Written Opinion for PCT/US2014/072578 dated Sep. 1, 2015.

*Primary Examiner* — Hovhannes Baghdasaryan
(74) *Attorney, Agent, or Firm* — Benjamin Fite; Tumey L.L.P.

(57) ABSTRACT

A dual core geophone includes a dual magnetic core packaged in a housing providing higher sensitivity and a reduction of electric wires in the device. The geophone includes a locking mechanism for the dual magnetic core to protect the device from strong vibrations when the device is not in use. A method for measuring acoustic vibrations in a downhole with a dual core geophone as above includes locking the dual magnetic core when the geophone is not detecting acoustic vibrations.

26 Claims, 8 Drawing Sheets

(56) References Cited

U.S. PATENT DOCUMENTS

| | | |
|---|---|---|
| 7,639,566 B2 | 12/2009 | Kamata et al. |
| 2003/0179103 A1 | 9/2003 | Kamata |
| 2009/0238043 A1* | 9/2009 | Kamata ................. G01V 1/184 367/182 |
| 2011/0023614 A1 | 2/2011 | Chisum et al. |

* cited by examiner

DUAL CORE LOCKING GEOPHONE

BACKGROUND

The present disclosure relates to geophones used in oil and gas exploration and extraction and, more particularly, to dual core geophones that include a locking mechanism for the geophone mass to avoid damage and failure of the vibration sensitive mechanism.

In the field of oil and gas exploration and extraction, physical properties of the geological formations traversed by a wellbore are often determined using acoustic sensors. In many instances, it is desirable to obtain information while drilling the downhole, as in a logging while drilling (LWD) or measuring while drilling (MWD) application. Some configurations of acoustic sensors generate shock waves of high intensity to collect acoustic information from the seismic activity following the shock. In these situations, extreme operational conditions affect the acoustic sensor at least in terms of pressure, temperature, vibration and shock. As a result, acoustic sensors tend to have a short lifetime and are prone to malfunction after a short operational period. Attempts to use stronger materials to build the mechanical components of acoustic sensors have resulted in heavier and more complex devices having multiple wires and connectors. However, these ruggedized sensors lack the sensitivity that would be desirable in such extreme conditions.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1:
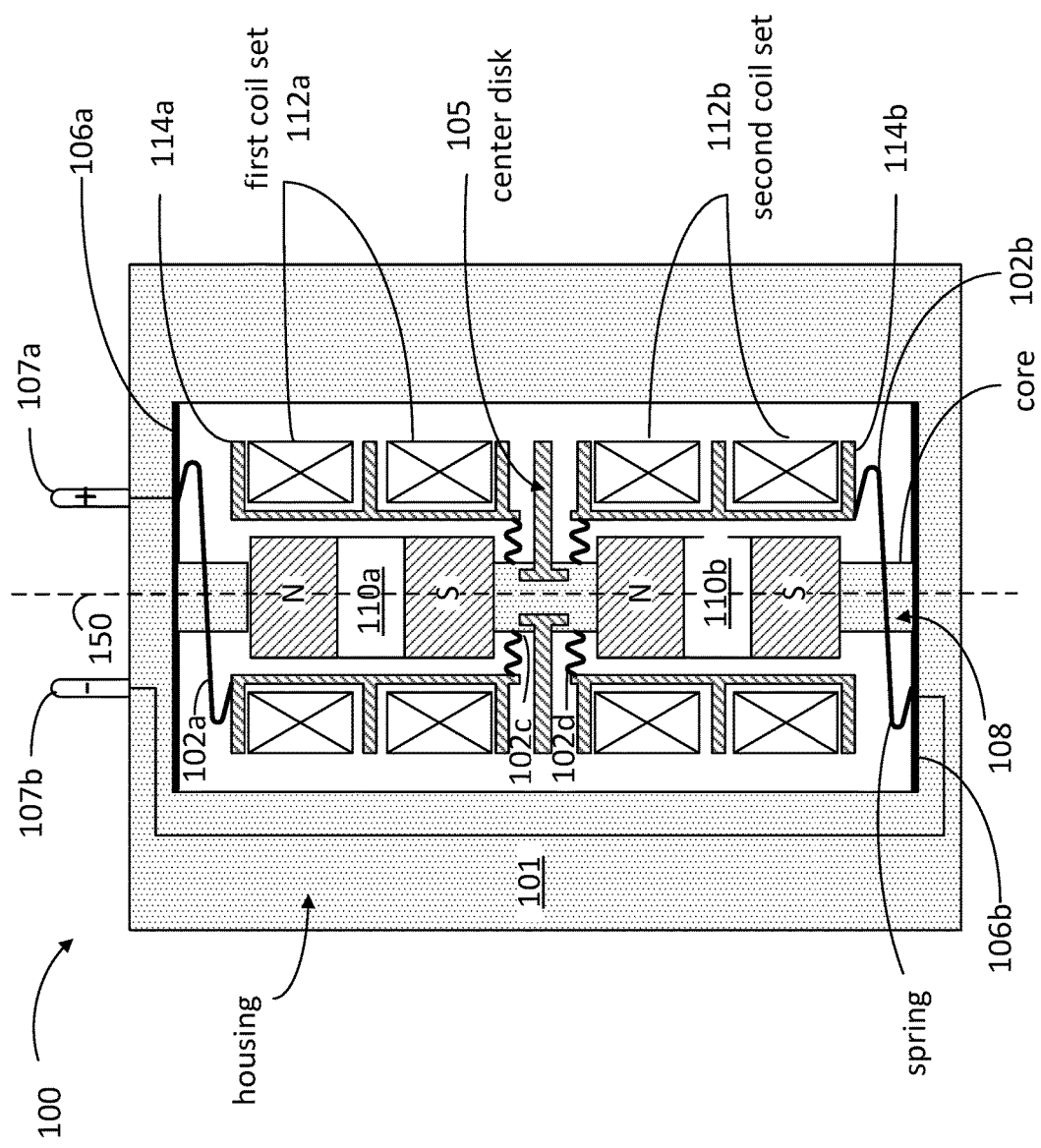
FIG. 1 illustrates a cross sectional view of a dual core geophone, according to some embodiments.

The present disclosure relates to geophones used in oil and gas exploration and extraction and, more particularly, to dual core geophones that include a locking mechanism for the geophone mass to avoid damage and failure of the vibration sensitive mechanism.

Embodiments consistent with the present disclosure include a highly sensitive and rugged acoustic sensor to provide accurate measurements for downhole seismic logging for an extended lifetime. Devices consistent with the present disclosure provide a solution to the stringent vibration challenges common in Seismic While Drilling (SWD) applications. In SWD applications, it is desirable to measure properties of acoustic waves propagating through the different strata traversed by a wellbore drilled for the purpose of oil and gas exploration and extraction. Acoustic sensors are devices configured to transduce a displacement produced by an acoustic wave into an electrical signal, such as a current or a voltage. Acoustic sensors consistent with the present disclosure include geophones.

Geophones are sensors used in downhole tools such as drills, for check-shot surveys and vertical-seismic-profiling. Geophone survivability in harsh downhole conditions, such as those common to downhole drilling operations, is a challenge due to the high pressure, vibration and temperatures. Large vibrations and shock experienced by logging-while-drilling (LWD) or measuring-while-drilling (MWD) tools affect associated sensors with moving masses such as geophones, resulting in premature sensor failure. With deeper drilling, more sensitive acoustic sensors are desirable due to the attenuation of seismic waves. Embodiments as disclosed herein include a dual core geophone that provides increased sensitivity, reduction in cabling and the possibility of having features for ensuring sensor survivability in hostile (high temperature, pressure, etc.) environments. In some embodiments, a geophone as disclosed herein may operate at temperature conditions of up to 200° C., or more. Furthermore, embodiments disclosed herein allow acoustic measurements in any orientation relative to gravity (omnidirectional acoustic sensor).

Geophones are vibration sensitive devices that dynamically operate as a mass-spring-damper system, and electrically operate as an inductor-resistor system. The working principle of geophones is analogous to a mass-spring-damper mechanical system for its dynamic behavior coupled to an inductor-resistor electrical system for its electrical induction properties. When the magnet moves relative to the coil it induces a potential difference in the coil to "resist" the mass motion, which is recorded as a sensor measurement. In some embodiments, the magnet may be stationary while the mass and coil moves relative to it, without limitation of the scope of the present disclosure. Accordingly, in some embodiments the magnet may be the moving mass and the coils are stationary. In that regard, one of ordinary skill recognizes that there is no limitation as to which one of the magnet, the coils, or magnets and coils are moving masses. Accordingly, a voltage is induced when there is relative motion between coil and magnet. The high vibration in downhole environments causes excess movement of the geophone mass and fatigue failure to occur in the geophone spring. A geophone as disclosed herein includes a dual magnetic core packaged in a housing and having two electrical connectors. A dual magnetic core as disclosed herein provides higher sensitivity, a reduction of electric wiring as well as the ability to lock the geophone mass in position when it is not in usage.

Device sensitivity and signal-to-noise ratio (SNR) are increased when a plurality of geophones are connected in series. In that regard, a dual core as disclosed herein provides an improved sensitivity and increases data quality for post processing. In addition, packaging of the dual coil, as described herein, reduces wire counts by half, which points to reduced complication in wiring and electronics.

Embodiments consistent with the present disclosure include multiple methods to reduce failure due to vibration such as restriction of the moving mass and addition of gaskets for increased damping in the mass motion. The methods are not restricted to be implemented in a single setting, but can also be done with a combination of the below listed methods. Accordingly, some of the geophones disclosed herein to reduce failure include a radial locking mechanism for the moving mass, an axial locking mechanism for the moving mass, a damping gasket, or a combination thereof.

FIG. 1 illustrates a cross sectional view of an exemplary dual core geophone 100, according to some embodiments. Dual core geophone 100 includes a housing 101 having plates 106a,b enclosing a core 108 aligned with a sensing axis 150. Geophone 100 also includes a first magnet 110a disposed on core 108 with a north-south (N-S) polarity aligned with sensing axis 150. A first coil set 112a is disposed around core 108 and may overlap first magnet 110a at least partially. First coil set 112a is mechanically coupled to housing 101 through a spring 102a, and a plate 106a. A second magnet 110b is axially offset from first magnet 110a along core 108 with an N-S polarity aligned in parallel with the polarity of first magnet 110a. A second coil set 112b is disposed around core 108 and overlaps second magnet 110b at least partially. A second spring 102b mechanically couples second coil set 112b to housing 101, together with a plate 106b. A first connector 107a may be electrically coupled to first coil set 112a and a second connector 107b may be electrically coupled to the second coil set 112b. In some embodiments, spring 102a electrically couples first connector 107a to first coil set 112a through spring 102a, and spring 102b electrically couples second connector 107b to second coil set 112b. In some embodiments, first coil set 112a and second coil set 112b are electrically coupled in series. In some embodiments, springs 102c and 102d couple mechanically core 108 to coil sets 112a,b. First coil set 112a is electrically coupled to second coil set 112b through springs 102c and 102d. Spring 102c also couples mechanically first coil set 112a to core 108. Spring 102d also couples mechanically second coil set 112b to core 108. Springs 102a, 102b, 102c and 102d will be collectively referred to hereinafter as 'springs 102'.

In some embodiments, first coil set 112a includes a conducting element, such as a wire, wound multiple times around a bobbin 114a. And second coil set 112b includes a conducting element, such as a wire, wound multiple times around a bobbin 114b. A center disk 105 may be coupled to core 108 and may interpose and otherwise axially separate first coil set 112a from second coil set 112b. As illustrated, center disk 105 extends radially out from core 108, interposing first and second coil sets 112a,b in a top-to-bottom view of FIG. 1. In some embodiments, first coil set 112a moves relative to core 108 along sensing axis 150 in a first motion and second coil set 112b moves relative to core 108 along the sensing axis 150 in a second motion. The second motion may be independent from the first motion, thus enhancing the sensitivity of dual core geophone 100.

Figure 2:
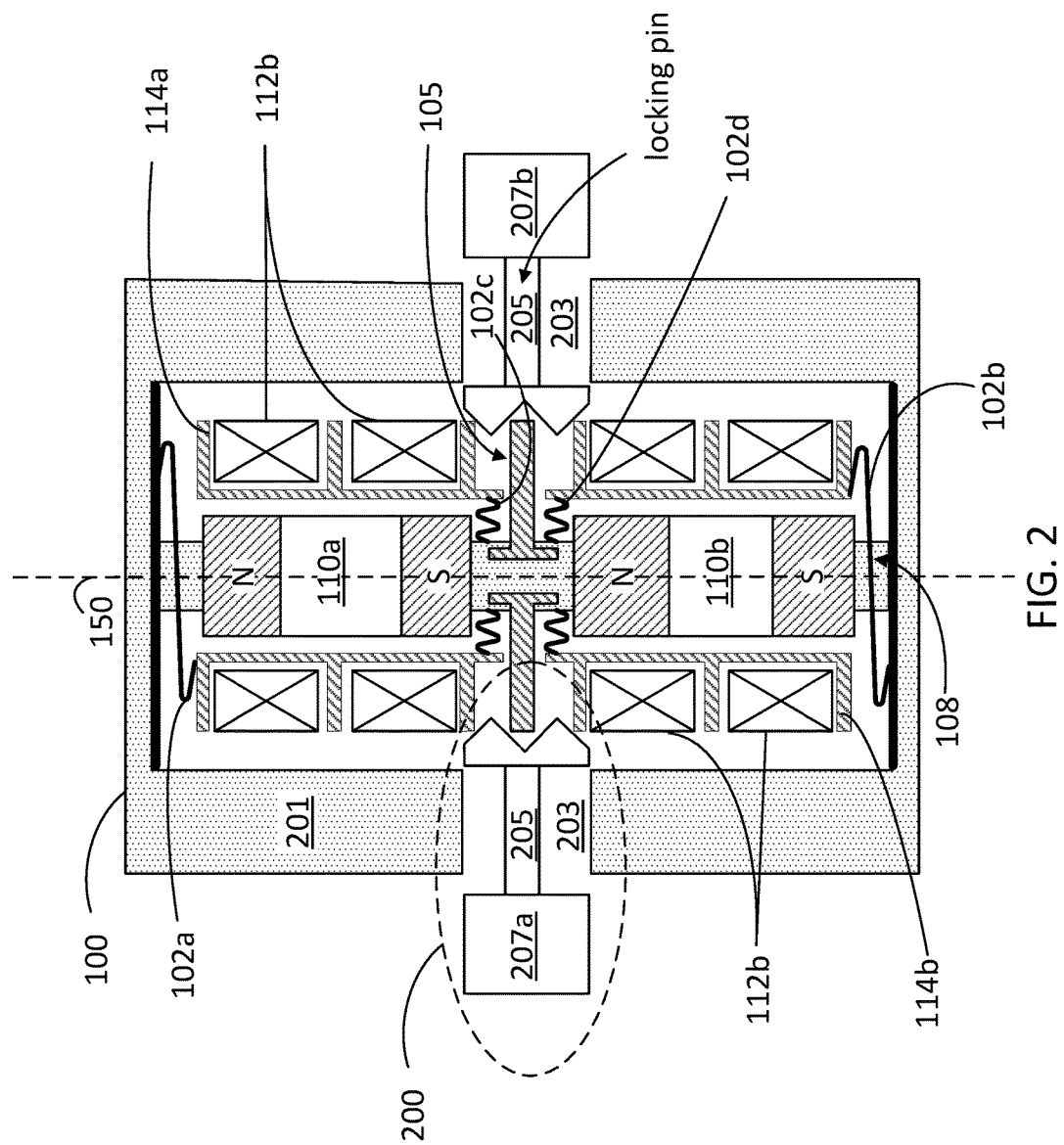
FIG. 2 illustrates a cross sectional view of a radial locking mechanism including a locking pin in a dual core geophone, according to some embodiments.

FIG. 2 illustrates a cross sectional view of dual core geophone 100 (hereinafter referred to as 'geophone 100') having a radial locking mechanism 200 that may include a locking pin 205, according to some embodiments. Similar reference numerals from FIG. 1 that are used in FIG. 2 represent similar components of the geophone 100 that will not be described again. Geophone 100 may further include a housing 201 similar to housing 101 (FIG. 1), and further including an aperture 203 that accommodates radial locking mechanism 200. Aperture 203 in housing 201 may include two circular apertures diametrically opposed (i.e., circumferentially offset from each other by 180°) in housing 201, as illustrated in FIG. 2. As will be appreciated, aperture 203 may have any other shape suitable to let at least a portion of radial locking mechanism 200 reach the interior portion of geophone 100.

In exemplary operation, radial locking mechanism 200 may be configured to apply a radial inward force to fix the position of core 108, relative to the first coil set 112a, and relative to the second coil set 112b. In the exemplary embodiments shown in FIG. 2, radial locking mechanism 200 includes at least one locking pin 205 (two shown) that extends through the apertures 203 and are able to be moved radially inward with respect to the housing 201 by an actuation mechanism 207a,b. As they move radially inward, the locking pin(s) 205 press on disk 105 and coil sets 112, thus locking core 108 and coil sets 112a,b in a fixed position relative to one another. Actuation mechanism 207a,b to move locking pin 205 may include a rotating actuator, a screw mechanism, a hydraulics mechanism, a pneumatic mechanism, or any combination thereof.

Figure 3:
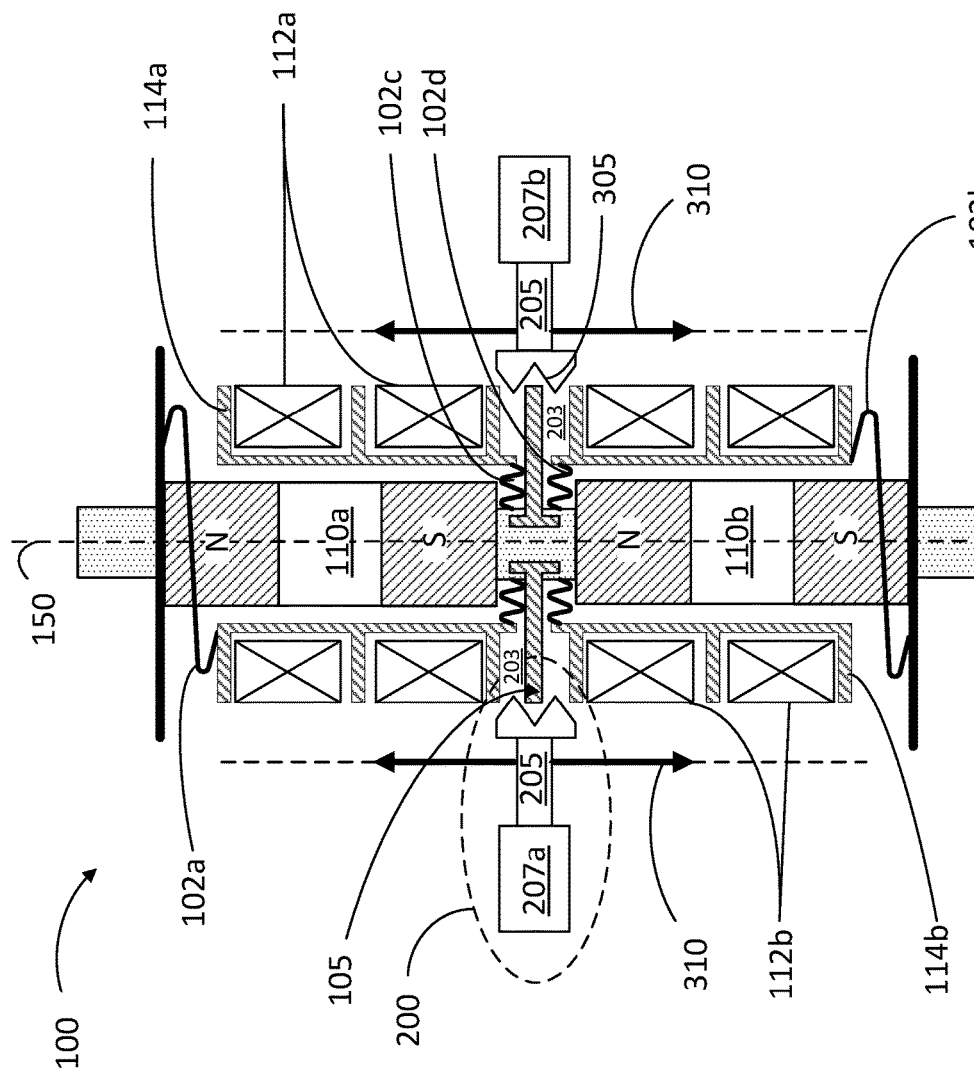
FIG. 3 illustrates a cross sectional view of a radial locking mechanism for adjusting the position of the top coil set and the bottom coil set relative to a zero displacement position in a dual core geophone, according to some embodiments.

FIG. 3 illustrates a cross sectional view of radial locking mechanism 200 configured to adjust the position of first coil set 112a and second coil set 112b relative to a zero displacement position along a direction parallel to sensing axis 150, according to some embodiments. Similar reference numerals from FIG. 1 that are used in FIG. 3 represent similar components of geophone 100 that will not be described again. In some embodiments, locking pin 205 may include a recess 305 to receive center disk 105 when the radial force is applied. In exemplary operation, locking pin 205 may be able to axially displace coil sets 112a,b along sensing axis 150 moving as indicated by the arrows 310, to find an equilibrium position for springs 102 that couple coil sets 112a,b to core 108. In the equilibrium position along sensing axis 150, springs 102 exert a negligible or zero restoring force on coil sets 112a,b; thus, achieving a more stable physical locking configuration. Placing coil sets 112a,b at the equilibrium position reduces mass movement during vibration and prevents potential failure in springs 102 due to fatigue and strain of the spring material.

An equilibrium position for coil sets 112a,b in geophone 100 may depend on the specific orientation of sensing axis 150 relative to gravity. For example, when sensing axis 150 is aligned close to a horizontal position the equilibrium position for coil sets 112 may be approximately at the center of core 108, since they may be generally unaffected by gravity. Moreover, when sensing axis 150 is aligned close to a vertical position, the equilibrium position may be slightly moved down with respect to the housing 101, 201 (FIGS. 1 and 2), relative to the horizontal equilibrium position, because of the weight of the coil sets 112a,b.

Figure 4:
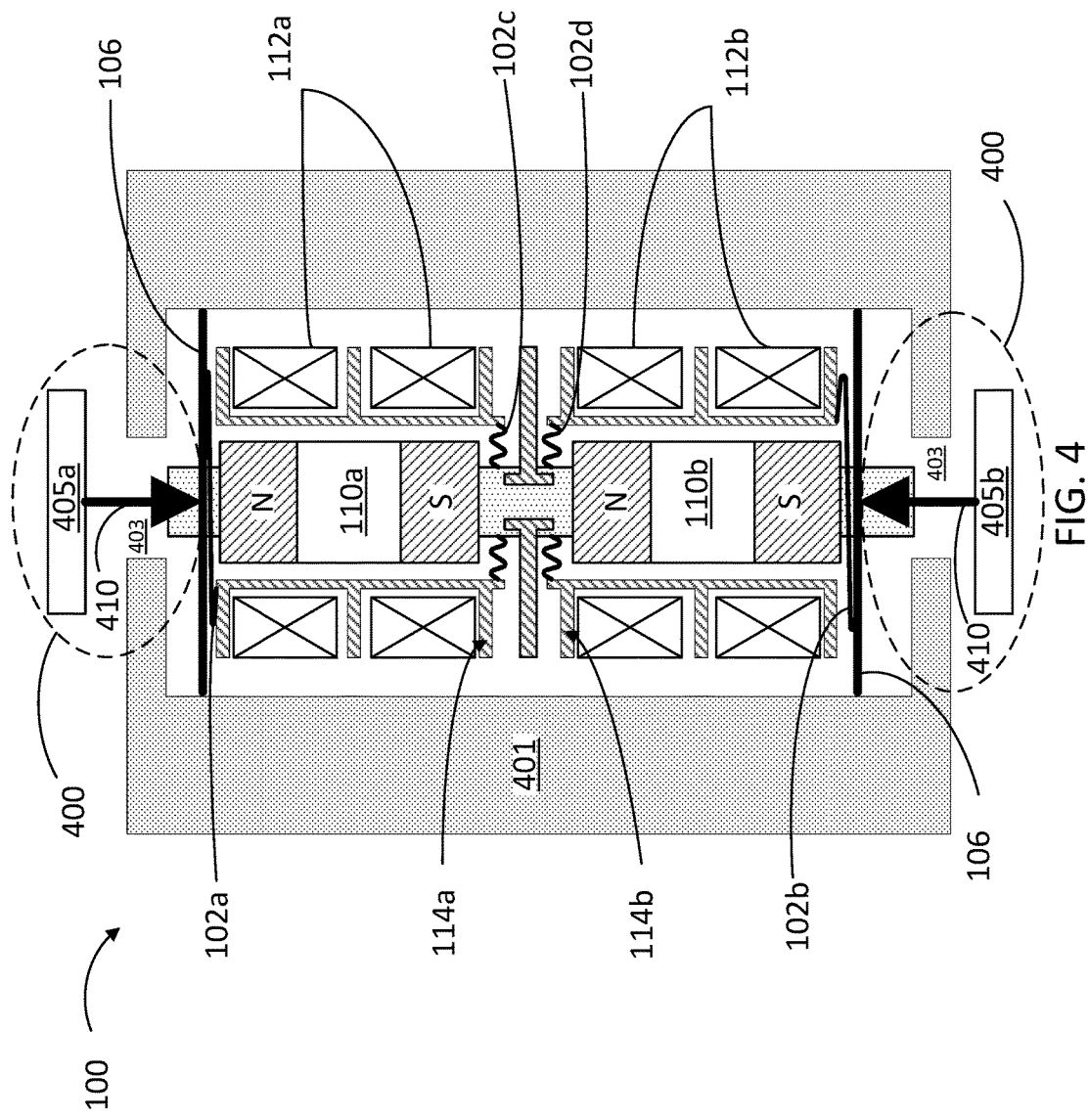
FIG. 4 illustrates a cross sectional view of an axial locking mechanism including an axial actuating mechanism in a dual core geophone, according to some embodiments.

FIG. 4 illustrates a cross sectional view of geophone 100 having an axial locking mechanism 400 that includes an axial actuators 405a,b, according to some embodiments. Similar reference numerals from FIG. 1 that are used in FIG. 4 represent similar components of the geophone 100 that will not be described again. Geophone 100 includes a housing 401 similar to housing 101 (FIG. 1), but further including an aperture 403 to accommodate axial locking mechanism 400. Aperture 403 in housing 401 may include two circles defined at opposing ends of housing 401, as illustrated in FIG. 4. Aperture(s) 403 in housing 401 may have any other shape suitable to let at least a portion of axial locking mechanism 400 reach the interior portion of geophone 100.

In exemplary operation, axial locking mechanism 400 locks the geophone mass by applying axial forces 410 along sensing axis 150 (not shown for simplicity), and thereby compressing springs 102 between plates 106. Actuators 405a and 405b provide compressional force 410 using one of a rotation mechanism, a screw mechanism, a hydraulics mechanism, a pneumatic mechanism, or any combination of the above.

Figure 5:
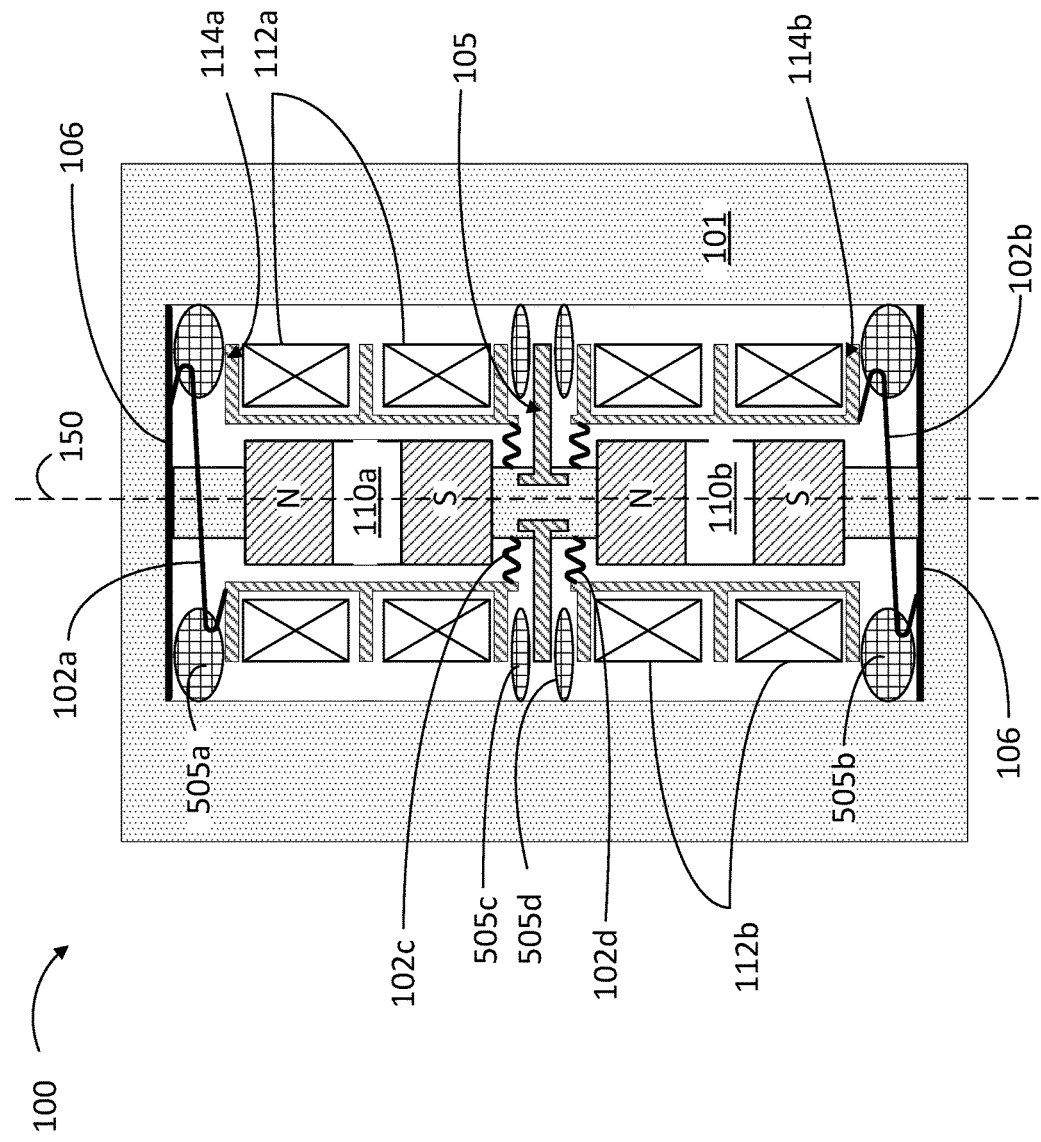
FIG. 5 illustrates a cross sectional view of a dual core geophone including damping gaskets to prevent failure and enhance device robustness, according to some embodiments.

FIG. 5 illustrates a cross sectional view of a dual core geophone 100 including damping gaskets 505a, 505b, 505c, and 505d (hereinafter collectively referred to as gaskets 505) to prevent failure of springs 102 and enhance device robustness, according to some embodiments. Similar reference numerals from FIG. 1 that are used in FIG. 5 represent similar components of the geophone 100 that will not be described again. Gaskets 505 can be positioned within geophone 100 at locations configured to restrict movement and increase damping forces on the moving mass of coil sets 112. The inclusion of gaskets 505 improves sensor robustness in a downhole environment because damping gaskets 505 absorb and dissipate a portion of the acoustic energy transmitted to the geophone 100, and thereby reduce shock impact that would otherwise be assumed by the internal components of geophone 100. In the exemplary embodiments of FIG. 5, a first damping gasket 505a may interpose first coil set 112a and an inner wall at the top of housing 101, and a second damping gasket 505b may interpose second coil set 112b and an inner wall at the bottom of housing 101. Some embodiments further include additional damping gaskets 505c and 505d that interpose each of the first coil set 112a and center disk 105 (gasket 505c), and second coil set 112b and the center disk 105 (gasket 505d). Accordingly, damping gaskets 505 may be configured to assume shock and vibration loading in the axial direction and otherwise help mitigate damage to the geophone 100 caused by extreme shock and/or vibration loading.

Figure 6:
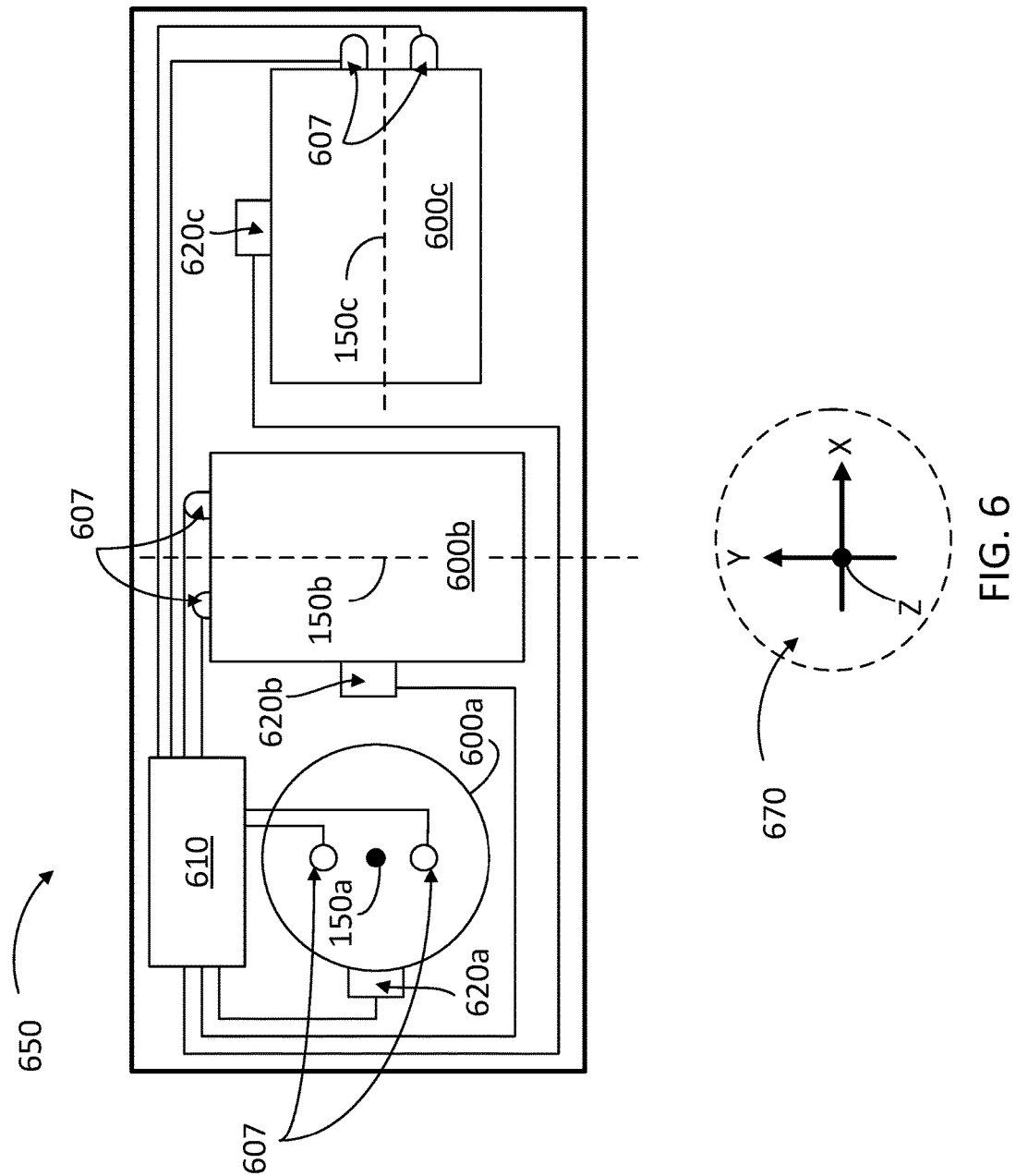
FIG. 6 illustrates a plan view of an acoustic sensor using a plurality of geophones, according to some embodiments.

FIG. 6 illustrates a plan view of an acoustic sensor 650 using a plurality of geophones 600a, 600b, and 600c (hereinafter referred to collectively as geophones 600), according to some embodiments. While only three geophones 600 are depicted as being included in acoustic sensor 650, it will be appreciated that this number is merely illustrative and any number of geophones 600 can be included in an acoustic sensor consistent with the present disclosure. In embodiments consistent with the present disclosure, at least one of geophones 600 is a dual core locking geophone, similar to any of the embodiments of geophone 100 generally described above (cf. FIG. 1). Accordingly, at least one of geophones 600 includes the first and second magnets 110a, 110b disposed on core 108 with a polarity aligned with the first sensing axis 150. Also, at least one of geophones 600 includes first and second coil sets 112a, 112b disposed around the core 108 and overlapping the first and second magnet 110a and 110b respectively, along sensing axis 150 (cf. FIG. 1). The first and second springs 102a,b may interpose and mechanically couple the first and second coil sets 112a,b to housing 101 (FIG. 1). In addition, the first and second coil sets 112a, 112b may be electrically coupled in series.

As illustrated in FIG. 6, first geophone 600a includes a first sensing axis 150a, the second geophone 600b includes a second sensing axis 150b, and the third geophone 600c includes a third sensing axis 150c. In embodiments consistent with the present disclosure, first sensing axis 150a, second sensing axis 150b, and third sensing axis 150c are perpendicular or approximately perpendicular to each other. Hereinafter sensing axes 150a, 150b, and 150c will be referred to collectively as 'sensing axes 150.' In operation, in some embodiments, sensing axes 150 in acoustic sensor 650 may form a three-dimensional (3D) Cartesian coordinate frame 670.

Each of geophones 600 further includes a locking actuator 620a, 620b, and 620c, respectively (hereinafter collectively referred to as 'locking actuators 620'). In at least in the one dual core geophone included in sensor 650, locking actuators 620 may be configured to fix the position of the first and second coil sets 112a, 112b and the core relative to each other. Further, according to some embodiments, locking actuators 620 include at least one of a radial locking actuator or an axial locking actuator used to manipulate the radial and axial positions of the radial locking mechanism 200 (FIG. 2) and the axial locking mechanism 400 (FIG. 4), respectively. Sensor 650 also includes a controller 610 coupled to each of geophones 600 through actuators 620 and connectors 607. Controller 610 may include a memory circuit storing commands, and a processor circuit configured to execute the commands in the memory circuit. The memory circuit may include any type of machine-readable medium used in the art. Accordingly, when the processor circuit performs the commands it causes controller 610 to communicate with geophones 600 and perform measurements according to methods disclosed herein.

Acoustic sensor 650 enables acoustic measurements in any orientation relative to gravity (omni-directional acoustic sensor). Accordingly, sensors consistent with embodiments as shown in FIG. 6 are desirable in drilling systems where the borehole may have a horizontal or quasi-horizontal orientation, or where the borehole transitions from a vertical orientation to a horizontal or quasi-horizontal orientation.

Figure 7:
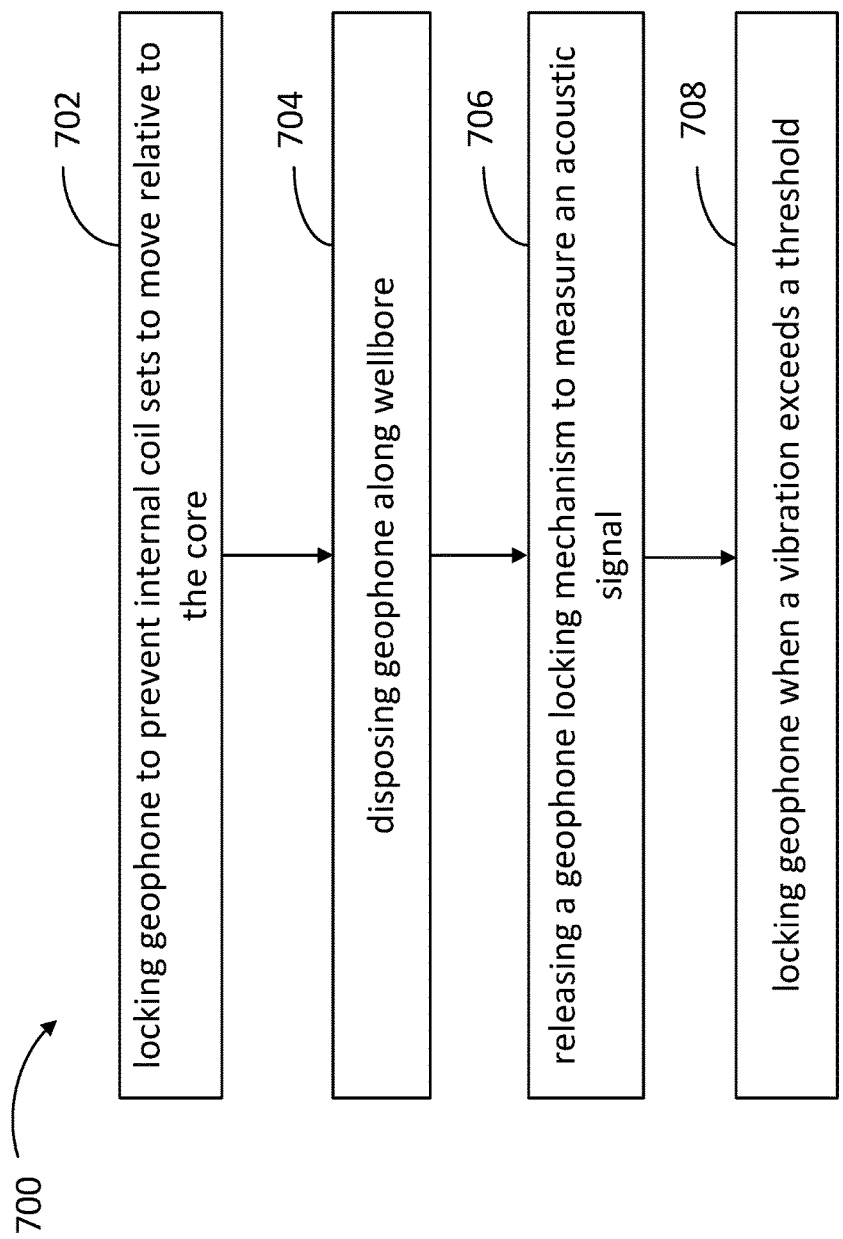
FIG. 7 illustrates a flow chart including steps in a method for measuring acoustic vibrations in a downhole with a dual core geophone, according to some embodiments.

FIG. 7 illustrates a flow chart including steps in a method 700 for measuring acoustic vibrations in a wellbore with a dual core geophone, according to some embodiments. The geophone in method 700 may be similar to or the same as dual core geophone 100 of FIG. 1 or at least one of the geophones 600a, 600b, 600c in the acoustic sensor 650 of FIG. 6. Accordingly, the geophone may include a housing, a first and a second magnet mounted on a core inside the housing, and a first and a second coil sets around the core, the core being aligned along a sensing axis (e.g., housing 101, magnets 110, coil sets 112, core 108, and sensing axis 150, all of FIG. 1). Furthermore, in some embodiments consistent with method 700 the geophone may include a locking mechanism having actuators (e.g., radial and/or axial locking mechanisms 200 and 400 of. FIGS. 2 and 4, respectively). The actuators may comprise any type of actuation device or mechanism including, but not limited to, a rotation mechanism, a screw mechanism, a hydraulics mechanism, a pneumatic mechanism, or any combination of the above.

Step 702 includes locking a geophone to prevent its internal coils sets from movement relative to a core. Step 702 may be performed prior to starting of a drilling tool to form a wellbore with the objective of preventing the geophone from damage produced by high vibration amplitude and shock that the tool creates as it forms the wellbore path. Accordingly, in some embodiments step 702 is performed as the tool progresses along the wellbore. In some embodiments, step 702 includes providing a radial force to fix internal components in the geophone, such as a center disk and the first and second coil sets. Accordingly, in some embodiments step 702 may also include displacing the first and second coil sets along a sensing axis in the geophone, to an equilibrium position, and then locking the geophone in place. In some embodiments, step 702 includes providing a vertical force along the sensing axis to fix the internal components in the geophone with respect to one another (e.g., the coil sets fixed relative to the core and the magnets). Step 702 may include actuating a rotation mechanism, actuating a screw mechanism, actuating a hydraulics mechanism, actuating a pneumatic mechanism, or any combination of the above in order to move the geophone to the equilibrium position and locking it in place.

Step 704 includes introducing the geophone into a wellbore. In some embodiments consistent with method 700, the geophone is one of a plurality of geophones arranged in a row, or a matrix of sensors spaced at known intervals from one another along a drill string. In some embodiments, step 704 also includes disposing an acoustic source at a known location relative to the geophone. An acoustic source may be an explosive charge, or an impact device configured to generate an acoustic pulse or signal that propagates through the geological formations traversed by the wellbore.

In some embodiments, step 704 includes aligning the geophone's sensing axis along a longitudinal direction in the downhole. Furthermore, step 704 may include aligning the geophone's sensing axis in a direction perpendicular to the longitudinal direction in the downhole. Moreover, in some embodiments step 704 includes disposing at least two geophones with sensing axes aligned in a perpendicular direction relative to one another. For example, in one embodiment step 704 includes disposing three geophones with sensing axes aligned perpendicular to one another, and one of the sensing axes aligned with the longitudinal direction of the wellbore. In some embodiments, the longitudinal direction of the wellbore may coincide or be approximately parallel to gravity (vertical wellbore). In some embodiments, the longitudinal direction of the wellbore may deviate substantially from gravity, for example, the wellbore may be horizontal or almost horizontal at certain points.

Step 706 includes releasing a geophone locking mechanism to measure an acoustic signal. Accordingly, step 706 may include releasing the geophone locking mechanism shortly before an explosive device has gone off and before the shock wave produced by the explosive device and carrying an acoustic pulse impinges on the geophone. The amount of time taken for the seismic wave to travel is typically short. Thus, in some embodiments step 706 includes releasing the geophone prior to seismic wave generation and after drilling stops and mud circulation is turned 'off.' In some embodiments step 706 includes releasing the geophone shortly after the geophone is disposed in its desired location. Step 708 includes locking the geophone with the radial and/or axial locking mechanisms when a vibration exceeds a threshold, thus extending the operational lifetime of the geophone by avoiding the accrued material fatigue, wear and stress produced by strong vibrations produced by the drilling tool.

One of ordinary skill in the art will recognize that methods consistent with the present disclosure may include at least one, but not all, of the steps in method 700. Moreover, methods consistent with the present disclosure may include at least all of the steps in method 700. And methods consistent with the present disclosure may include at least one of the steps in method 700 performed in sequence or overlapping in time. Furthermore, methods consistent with method 700 may include at least one of the steps in method 700 performed in any order, simultaneously in time, or almost simultaneously in time.

Figure 8:
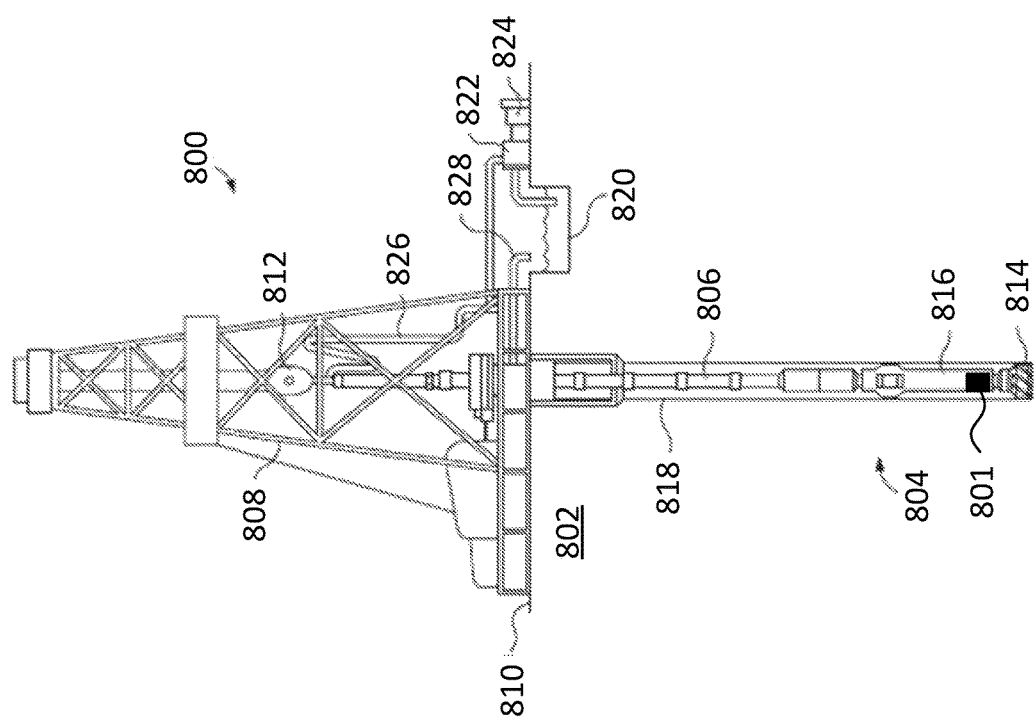
FIG. 8 illustrates an exemplary drilling system employing a sensor incorporating a dual core geophone, according to some embodiments.

FIG. 8 illustrates an exemplary drilling system 800 employing a sensor 801 incorporating a dual core geophone, according to some embodiments. The dual core geophone in sensor 801 may be the same as or similar to any of the dual core geophones described herein. Moreover, in some embodiments, sensor 801 may be the same as or similar to acoustic sensor 650, which uses a plurality of geophones, as described in FIG. 6 above. Boreholes may be created by drilling into the earth 802 using drilling system 800. Drilling system 800 may be configured to drive a bottom hole assembly (BHA) 804 positioned or otherwise arranged at the bottom of a drill string 806 extended into the earth 802 from a derrick 808 arranged at the surface 810. The derrick 808 includes a kelly 812 used to lower and raise the drill string 806.

The BHA 804 may include a drill bit 814 operatively coupled to a tool string 816 which may be moved axially within a drilled wellbore 818 as attached to the drill string 806. During operation, drill bit 814 penetrates the earth 802 to form wellbore 818. BHA 804 provides directional control of drill bit 814 as it advances into the earth 802. Tool string 816 can be semi-permanently mounted with various measurement tools such as a measurement-while-drilling (MWD) tool and a logging-while-drilling (LWD) tool. The sensor 801 may form part of one of the MWD or LWD tools to obtain downhole measurements of drilling conditions. In other embodiments, the measurement tools may be self-contained within the tool string 816, as shown in FIG. 8. In some embodiments, tool string 816 may include a cable for electrically coupling a battery, a power supply, or a detector circuit at surface 810 to connectors in the dual core geophone inside sensor 801 (e.g., connectors 107 of FIGS. 1 and 6). In some embodiments, a dual core geophone in sensor 801 may be powered by a battery internal to sensor 801, and a wire may carry an electrical signal from sensor 801 to surface 810.

Fluid or "mud" from a mud tank 820 may be pumped downhole using a mud pump 822 powered by an adjacent power source, such as a prime mover or motor 824. The mud may be pumped from the mud tank 820, through a stand pipe 826, which feeds the mud into the drill string 806 and conveys the same to the drill bit 814. The mud exits one or more nozzles arranged in the drill bit 814 and in the process cools the drill bit 814. After exiting the drill bit 814, the mud circulates back to the surface 810 via the annulus defined between the wellbore 818 and the drill string 806, and in the process returns drill cuttings and debris to the surface 810. The cuttings and mud mixture are passed through a flow line 828 and are processed such that a cleaned mud is returned down hole through the stand pipe 826 once again. Accordingly, sensor 801 may be used for seismic measurements while the wellbore 818 is being drilled. Seismic measurement procedures using sensor 801 may include any one or all of the steps in a method for measuring acoustic vibrations in a wellbore (e.g., method 700, cf. FIG. 7).

Although drilling system 800 is shown and described with respect to a rotary drill system in FIG. 8, many types of drilling systems can be employed in carrying out embodiments of the disclosure. For instance, drills and drill rigs used in embodiments of the disclosure may be used onshore (as depicted in FIG. 8) or offshore (not shown). Offshore oil rigs that may be used in accordance with embodiments of the disclosure include, for example, floaters, fixed platforms, gravity-based structures, drill ships, semi-submersible platforms, jack-up drilling rigs, tension-leg platforms, and the like. It will be appreciated that embodiments of the disclosure can be applied to rigs ranging anywhere from small in size and portable, to bulky and permanent. Further, although described herein with respect to oil drilling, various embodiments of the disclosure may be used in many other applications. For example, disclosed methods can be used in drilling for mineral exploration, environmental investigation, natural gas extraction, underground installation, mining operations, water wells, geothermal wells, and the like. Further, embodiments of the disclosure may be used in weight-on-packers assemblies, in running liner hangers, in running completion strings, etc., without departing from the scope of the disclosure.

While embodiments as disclosed herein are implemented in the context of MWD or LWD as described in FIG. 8, some embodiments may include use of geophones as disclosed herein in wireline applications as well. Please add at least a paragraph saying. In some embodiments, geophone(s) as disclosed herein may be disposed in a sonde or a tool conveyed by a wireline, a slickline, or a coiled tubing. Accordingly, in such configurations the locking the geophones may be a desirable feature to increase the lifetime expectancy of the devices.

It is recognized that the various embodiments herein directed to computer control and artificial neural networks, including various blocks, modules, elements, components, methods, and algorithms, can be implemented using computer hardware, software, combinations thereof, and the like. To illustrate this interchangeability of hardware and software, various illustrative modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of commands, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of commands contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides commands to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. A device that includes a housing enclosing a core aligned with a sensing axis, a first magnet disposed on the core with a polarity aligned with the sensing axis, a first coil set disposed around the core and overlapping the first magnet along the sensing axis, the first coil set being mechanically coupled to the housing with a first spring, a second magnet disposed on the core and axially offset from the first magnet with a polarity aligned parallel with the polarity of the first magnet, and a second coil set disposed around the core and overlapping the second magnet along the sensing axis, the second coil set being mechanically coupled to the housing with a second spring, wherein the first coil set and the second coil set are electrically coupled in series, and the core is mechanically coupled to the first coil set through a third spring and mechanically coupled to the second coil set through a fourth spring.

B. An acoustic sensor that includes a first geophone having a first sensing axis, and a second geophone having a second sensing axis perpendicular to the first sensing axis, wherein at least the first geophone comprises a housing enclosing a core aligned with a sensing axis, a first magnet disposed on the core with a polarity aligned with the sensing axis, a first coil set disposed around the core and overlapping the first magnet along the sensing axis, the first coil set being mechanically coupled to the housing with a first spring, a second magnet disposed on the core and axially offset from the first magnet with a polarity aligned parallel with the polarity of the first magnet, and a second coil set disposed around the core and overlapping the second magnet along the sensing axis, the second coil set being mechanically coupled to the housing with a second spring, wherein the first coil set and the second coil set are electrically coupled in series, and the core is mechanically coupled to the first coil set through a third spring and mechanically coupled to the second coil set through a fourth spring.

C. A method that includes locking a geophone to prevent internal coil sets from moving relative to a core, introducing the geophone into a wellbore, releasing a geophone locking mechanism to measure an acoustic signal, and locking the geophone with the geophone locking mechanism when a vibration exceeds a threshold.

Each of embodiments A, B, and C may have one or more of the following additional elements in any combination: Element 1: further comprising a center disk coupled to the core and extending radially therefrom, the center disk interposing and separating the first coil set from the second coil set. Element 2: further comprising a first connector electrically coupled to the first coil set, and a second connector electrically coupled to the second coil set. Element 3: wherein the first connector is electrically coupled to the first coil set through the first spring, and the second connector is electrically coupled to the second coil set through the second spring. Element 4: wherein the first coil set is electrically coupled to the second coil set through the third and fourth springs. Element 5: wherein the first coil set moves relative to the core along the sensing axis in a first motion and the second coil set moves relative to the core along the sensing axis in a second motion independent of the first motion. Element 6: further comprising a first damping gasket interposing the housing and at least one of the first coil set and the second coil set. Element 7: further comprising a second damping gasket interposing the center disk and at least one of the first coil set and the second coil set. Element 8: further comprising at least one radial locking mechanism extendable through at least one aperture defined in the housing to apply a radial force that fixes a relative position of each of the core, the first coil set, and the second coil set with respect to the housing. Element 9: wherein the at least one radial locking mechanism comprises a locking pin having a recess to receive the center disk when the radial force is applied, and wherein the locking pin axially displaces the first and second coil sets along the sensing axis to find an equilibrium position for the first and second springs. Element 10: further comprising at least one axial locking mechanism having an axial actuator that compresses the first spring and the second spring along the sensing axis to fix the relative position of each of the core, the first coil set, and the second coil set with respect to the housing. Element 11: wherein the at least one axial actuator is selected from the group consisting of a rotation mechanism, a screw mechanism, a hydraulics mechanism, a pneumatic mechanism, or any combination thereof.

Element 12: wherein at least one of the first and second geophones further comprises at least one locking actuator configured to fix a position of the first coil set, the second coil set, and the core relative to each other. Element 13: wherein the at least one locking actuator comprises one of a radial locking actuator and an axial locking actuator.

Element 14: further comprising generating an acoustic signal that propagates through at least one geological formation traversed by the downhole. Element 15: wherein introducing the geophone into the wellbore comprises introducing a plurality of geophones into the wellbore arranged at a known distance from each other. Element 16: wherein introducing the geophone into the wellbore comprises aligning a sensing axis in the geophone along a longitudinal axis of the wellbore. Element 17: wherein introducing the geophone into the wellbore comprises disposing at least two geophones so that a sensing axis of a first geophone is perpendicular to a sensing axis of a second geophone. Element 18: wherein introducing the geophone into a wellbore comprises introducing the geophone into a wellbore in one of an offshore oil rig platform, or an onshore oil rig.

By way of non-limiting example, exemplary combinations applicable to A, B, and C include: Element 2 with Element 3; Element 5 with Element 6; Element 6 with Element 7; Element 8 with Element 9; and Element 10 with Element 11.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A device, comprising:
a housing enclosing a core aligned with a sensing axis;
a first magnet disposed on the core with a polarity aligned with the sensing axis;
a first coil set disposed around the core and overlapping the first magnet along the sensing axis, the first coil set being mechanically coupled to the housing with a first spring;
a second magnet disposed on the core and axially offset from the first magnet with a polarity aligned parallel with the polarity of the first magnet; and
a second coil set disposed around the core and overlapping the second magnet along the sensing axis, the second coil set being mechanically coupled to the housing with a second spring, wherein the first coil set and the second coil set are electrically coupled in series, and the core is mechanically coupled to the first coil set through a third spring and mechanically coupled to the second coil set through a fourth spring.

2. The device of claim 1, further comprising a center disk coupled to the core and extending radially therefrom, the center disk interposing and separating the first coil set from the second coil set.

3. The device of claim 1 further comprising:
a first connector electrically coupled to the first coil set; and
a second connector electrically coupled to the second coil set.

4. The device of claim 3, wherein the first connector is electrically coupled to the first coil set through the first spring, and the second connector is electrically coupled to the second coil set through the second spring.

5. The device of claim 1, wherein the first coil set is electrically coupled to the second coil set through the third and fourth springs.

6. The device of claim 2, wherein the first coil set moves relative to the core along the sensing axis in a first motion and the second coil set moves relative to the core along the sensing axis in a second motion independent of the first motion.

7. The device of claim 6, further comprising a first damping gasket interposing the housing and at least one of the first coil set and the second coil set.

8. The device of claim 7, further comprising a second damping gasket interposing the center disk and at least one of the first coil set and the second coil set.

9. The device of claim 2, further comprising at least one radial locking mechanism extendable through at least one aperture defined in the housing to apply a radial force that fixes a relative position of each of the core, the first coil set, and the second coil set with respect to the housing.

10. The device of claim 9, wherein the at least one radial locking mechanism comprises a locking pin having a recess to receive the center disk when the radial force is applied, and wherein the locking pin axially displaces the first and second coil sets along the sensing axis to find an equilibrium position for the first and second springs.

11. The device of claim 1, further comprising at least one axial locking mechanism having an axial actuator that compresses the first spring and the second spring along the sensing axis to fix the relative position of each of the core, the first coil set, and the second coil set with respect to the housing.

12. The device of claim 11, wherein the at least one axial actuator is selected from the group consisting of a rotation mechanism, a screw mechanism, a hydraulics mechanism, a pneumatic mechanism, or any combination thereof.

13. An acoustic sensor comprising:
a first geophone having a first sensing axis; and
a second geophone having a second sensing axis perpendicular to the first sensing axis, wherein at least the first geophone comprises:
a housing enclosing a core aligned with a sensing axis;
a first magnet disposed on the core with a polarity aligned with the sensing axis;
a first coil set disposed around the core and overlapping the first magnet along the sensing axis, the first coil set being mechanically coupled to the housing with a first spring;
a second magnet disposed on the core and axially offset from the first magnet with a polarity aligned parallel with the polarity of the first magnet; and
a second coil set disposed around the core and overlapping the second magnet along the sensing axis, the second coil set being mechanically coupled to the housing with a second spring, wherein the first coil set and the second coil set are electrically coupled in series, and the core is mechanically coupled to the first coil set through a third spring and mechanically coupled to the second coil set through a fourth spring.

14. The acoustic sensor of claim 13, wherein at least one of the first and second geophones further comprises at least one locking actuator configured to fix a position of the first coil set, the second coil set, and the core relative to each other.

15. The acoustic sensor of claim 14, wherein the at least one locking actuator comprises one of a radial locking actuator and an axial locking actuator.

16. A method, comprising:
locking a geophone to prevent internal coil sets from moving relative to a core;
introducing the geophone into a wellbore;
releasing a geophone locking mechanism;
measuring an acoustic signal based on a vibration;
determining whether the vibration exceeds a threshold; and
if the vibration exceeds the threshold, locking the geophone with the geophone locking mechanism to prevent the internal coil sets from moving relative to the core.

17. The method of claim 16, further comprising generating an acoustic signal that propagates through at least one geological formation traversed by the wellbore.

18. The method of claim 16, wherein introducing the geophone into the wellbore comprises introducing a plurality of geophones into the wellbore arranged at a known distance from each other.

19. The method of claim 16, wherein introducing the geophone into the wellbore comprises aligning a sensing axis in the geophone along a longitudinal axis of the wellbore.

20. The method of claim 16, wherein introducing the geophone into the wellbore comprises disposing at least two geophones so that a sensing axis of a first geophone is perpendicular to a sensing axis of a second geophone.

21. The method of claim 16, wherein introducing the geophone into a wellbore comprises introducing the geophone into a wellbore in one of an offshore oil rig platform, or an onshore oil rig.

22. The method of claim 16, wherein locking the geophone comprises applying a radial force to a center disk coupled to a core inside a housing through an aperture defined in the housing, the core supporting a first coil set and a second coil set.

23. The method of claim 22, wherein applying a radial force to a center disk comprises radially displacing a locking pin having a recess to receive the center disk.

24. The method of claim 23, further comprising displacing the locking pin axially to displace the first and second coil sets to an equilibrium position.

25. The method of claim 16, wherein locking the geophone comprises actuating an axial actuator to fix a relative position of a core, a first coil set, and a second coil set with respect to a housing of the geophone.

26. The method of claim 25, wherein actuating the axial actuator comprises actuating at least one of a rotation mechanism, a screw mechanism, a hydraulics mechanism, a pneumatic mechanism, or a combination thereof.

* * * * *